United States Patent [19]

Hebert et al.

[11] Patent Number: 5,516,923
[45] Date of Patent: May 14, 1996

[54] EXTRACTING OIL FROM OIL BEARING PLANT PARTS

[75] Inventors: Roland M. Hebert; Robert J. Stonicher, both of Breaux Bridge, La.; Robert T. Tucker, Broken Arrow, Okla.

[73] Assignee: Agritech International, Crowley, La.

[21] Appl. No.: 222,893

[22] Filed: Apr. 5, 1994

Related U.S. Application Data

[63] Continuation-in-part of Ser. No. 873,783, Apr. 27, 1992, abandoned.

[51] Int. Cl.$^6$ ............................................. C07C 1/00
[52] U.S. Cl. ........................... 554/12; 554/8; 554/11; 554/16; 554/20; 554/21
[58] Field of Search ..................... 559/8, 12, 11, 559/16, 20, 21

[56] References Cited

U.S. PATENT DOCUMENTS 5,281,732  1/1994  Franke ........................... 554/16

*Primary Examiner*—José G. Dees
*Assistant Examiner*—Deborah D. Carr
*Attorney, Agent, or Firm*—Keaty & Keaty

[57] ABSTRACT

The invention relates to a process for extracting oil from an oil bearing plant material with the use of a solvent suitable for dissolving the oil in the plant material. Grounded plant material is deposited into a reactor vessel, and vacuum is created in the reactor vessel. Liquid solvent is introduced into the reactor vessel and allowed to contact the plant material for a time sufficient to dissolve oil from the plant material, while the temperature in the reactor vessel is maintained at a level which prevents denaturing of constituent components of the plant oil and the plant material. Additional solvent vapors are introduced into the bottom of the reactor to cause mixing of the plant material and the solvent and separate fine particulate matter from heavier particles. Pressurized heated solvent vapors are introduced into the top of the reactor vessel while the liquid solvent and oil combination is being removed from the bottom of the reactor vessel through filters. To prevent clogging of filters in the bottom of the reactor vessel pressurized solvent vapors are forced through the filters into the bottom of the reactor vessel. The solvent and oil combination is transferred into a separator vessel, wherein the solvent is vaporized and removed for recycling, while the oil is removed into a holding tank.

36 Claims, 2 Drawing Sheets

EXTRACTING OIL FROM OIL BEARING PLANT PARTS

CROSS REFERENCE TO RELATED APPLICATION

This application is continuation-in-part of U.S. patent application Ser. No. 07/873,783, filed Apr. 27, 1992, lately in the Patent Office, to which priority is claimed, now abandoned.

BACKGROUND OF THE INVENTION

1. Field of the Invention

This invention relates to a method for extracting oil from oil-bearing plant parts such as seeds, fruits, nuts, leaves, germ, bran, bark, and roots and, more particularly, to a method for extracting these organic oils at sufficiently low temperatures (less than 160° F.) so as to not denature the proteins, vitamins and minerals, resulting in two useful and marketable substances, the oil and defatted meal.

2. Background

When harvested, rough rice, also called paddy rice or "paddy", consists of a starchy rice kernel surrounded by a tightly adhering brown coating of bran and enclosed within a loose outer hull or husk. In current commercial practice, the paddy is first dried and then milled. In a mechanical milling process, the hull and bran are removed to obtain white rice. The by-products of milling are rice hulls and rice bran. Rice hulls are mainly cellulose, lignin and minerals with no significant food or feed value. For the most part, hulls, which average by weight about 20% of the paddy, are discarded as waste material or used as a low-value soil conditioner, fuel or crude abrasive.

Rice bran, on the other hand, is rich in protein (13 to 16%) and food energy and contains high levels of natural vitamins and essential trace minerals. These qualities have led to a high demand for rice bran as an animal feed ingredient, and it is used extensively for this purpose throughout the world. Bran represents by weight 4 to 9 percent of the paddy, varying with location of cultivation and degree of milling.

Under normal conditions, when brown rice is milled to white rice, the oil in the bran (16 to 22%) and a potent lipase, also in the bran, come into contact with each other. This results in a rapid degradation of the oil to glycerol and free fatty acids. The bran thus produced is unpalatable and is not used as a foodstuff. Rather it is used as animal feed.

Hexane is conventionally used as a solvent for the extraction of rice bran oil from rice bran. Use of hexane poses potential air pollution problems. More importantly, hexane solvent extraction requires high operating temperatures (greater than or equal to approximately 160° F.) which denature or downgrade the functional and nutritional properties of rice bran and rice bran oil. Thus, some means of extracting rice bran oil from rice bran that does not denature or downgrade the functional and nutritional properties of rice bran and rice bran oil is desirable. More specifically, solvent extraction that does not require high operating temperatures (above approximately 160° F.), which result in denaturing of rice bran and rice bran oil, is desired.

Other solvents, such as propane, ethane, carbon dioxide, dinitrogenoxide, butane and isobutane, have been used for extraction of oil from oil bearing plant material, but either not at sufficiently low operating temperatures to avoid denaturing of proteins, vitamins and minerals or else using separate vessels to perform the dissolving and extraction steps, or both.

Conventionally, various methods exist for extracting oils from organic material, including the use of liquid hydrocarbons, for example, U.S. Pat. Nos. 4,331,695; 2,560,935; 183,097; 183,098; 2,485,916; 2,571,948; 2,727,914; 3,261,690; 3,271,160; 3,492,326; 3,542,559; 3,852,504; 4,457,869; 4,486,353; 2,548,434; and 1,802,533. U.S. Pat. No. 4,331,695 to Zosel discloses propane and other hydrocarbons as solvents; however, Zosel utilizes extremely high pressures (approximately 42 atmospheres), the extraction is done at high temperatures (80° C. to 176° C.) which would denature proteins, and appears to require constant pressure with a potential temperature swing from 0° C. to 100° C. The '935 patent discloses propane as a solvent at high temperature (substantially above 140° F.) in a two-stage extraction process. The '097 and '098 patents introduce water into the process.

The '916 patent discloses a pre-extraction process involving alcohols and soap at a temperature between 51° and 212° F., followed by heating almost to the boiling point of the solvent.

The '948 patent discloses steam distillation. The '914 patent discloses cooking rice bran prior to solvent extraction at a temperature above 170° F. The '690 patent uses super-heated steam to extract the oil from the solvent. The '160 patent discloses processing safflower seed residue after the oil is extracted.

The '326 patent discloses liquid hydrocarbon solvent extraction for extracting not more than 10% by weight of rice oil from rice bran at an entering temperature, using hexane, of between 120° F. and 160° F., subjecting brown rice to temperature between 125° F. to 130° F.

The '559 patent discloses hexane or liquid hydrocarbons at between 115° and 120° F. The '281 patent discloses extraction at both high temperature and high pressure. The '869 patent discloses high temperature extraction using isopropyl and isopropanol based solvents. The '353 patent uses ethanol at 158° F. and above.

The '434 patent discloses gaseous hydrocarbons at high pressure and high temperature (150° F. to 200° F.). The '533 patent discloses butane, propane and other hydrocarbons 80° F. and 30 psig or 60° F. and 15 psig, but the meal is placed in a separate still where it is heated to remove solvent.

SUMMARY OF THE INVENTION

The present invention provides a method for extracting rice bran oil from rice bran, the method including the steps of:

(1) placing rice bran containing rice bran oil into a reactor vessel;

(2) removing air from a reactor vessel by drawing a partial vacuum, introducing an inert gas under pressure into the reactor vessel to dispel additional air, and drawing a second partial vacuum;

(3) introducing into the reactor vessel a liquid solvent having solvent power for rice bran oil (i.e., capable of dissolving rice bran oil), the liquid solvent being maintained at a temperature between approximately 68° F. and 125° F., preferably between 68° F. and 72° F.;

(4) allowing the liquid solvent to contact the rice bran for a time sufficient to dissolve a substantial portion of the rice oil;

(5) introducing gaseous solvent into the bottom of the reactor vessel to mix the rice bran in the liquid solvent and oil mixture; and (6) removing the solvent and rice bran oil combination from the reactor vessel. Preferably, the solvent and rice bran oil combination is removed from the reactor vessel while additional liquid solvent is introduced into the reactor vessel, thereby washing the rice bran, until less than one percent by weight of rice bran oil remains in the rice bran.

Preferably, the removing of the solvent and oil combination and the introducing of additional liquid solvent is done simultaneously to maintain a relatively constant liquid level in the reactor vessel.

The temperature of the solvent is critical to successful practice of the invention. If the solvent is too hot (greater than approximately 125° F.), then oil will not wash well from the bran, possibly because the bran will not absorb the solvent well. If the solvent is too cool, then bran will absorb the solvent but the bran will not release the solvent and oil combination readily, thereby inordinately increasing process throughput time. Additionally, it is desirable to separate the rice bran particulate residue into various sizes.

More generally, the low temperature solvent extraction method is useful for extracting oil from oil bearing plant parts without denaturing vitamins, proteins and minerals contained therein.

Therefore, it is an object of this invention to provide a process for extracting rice bran oil from rice bran and, more generally, for extracting oil from oil-bearing plant parts. A more specific objective of the invention is to provide a process which includes contacting rice bran containing rice bran oil with a suitable solvent, the solvent and rice bran combination being maintained at a temperature below approximately 160° F. which does not denature the constituent components of rice bran oil and rice bran.

Another object of the invention is to provide a method for separating within a rector vessel different sizes of rice bran particulates during the process of extracting rice bran oil from rice bran.

Additional objects and advantages of the invention are set forth in part in the description which follows, and in part are obvious from the description or may be learned by practice of the invention. The objects and the advantages of the invention may be realized and obtained by means of the articles and apparatus particularly pointed out in the appended claims.

BRIEF DESCRIPTION OFF THE DRAWINGS

Reference will now be made to the drawings, wherein like parts are designated by like numerals, and wherein FIG. 1 is a schematic illustration of a system for extracting oil from an oil bearing plant material in accordance with the present invention.

FIG. 2 is an exploded, partially cutaway view of a filter device adapted for use in the reactor vessel in accordance with the present invention.

DETAILED DESCRIPTION OF THE INVENTION

Figure 1:
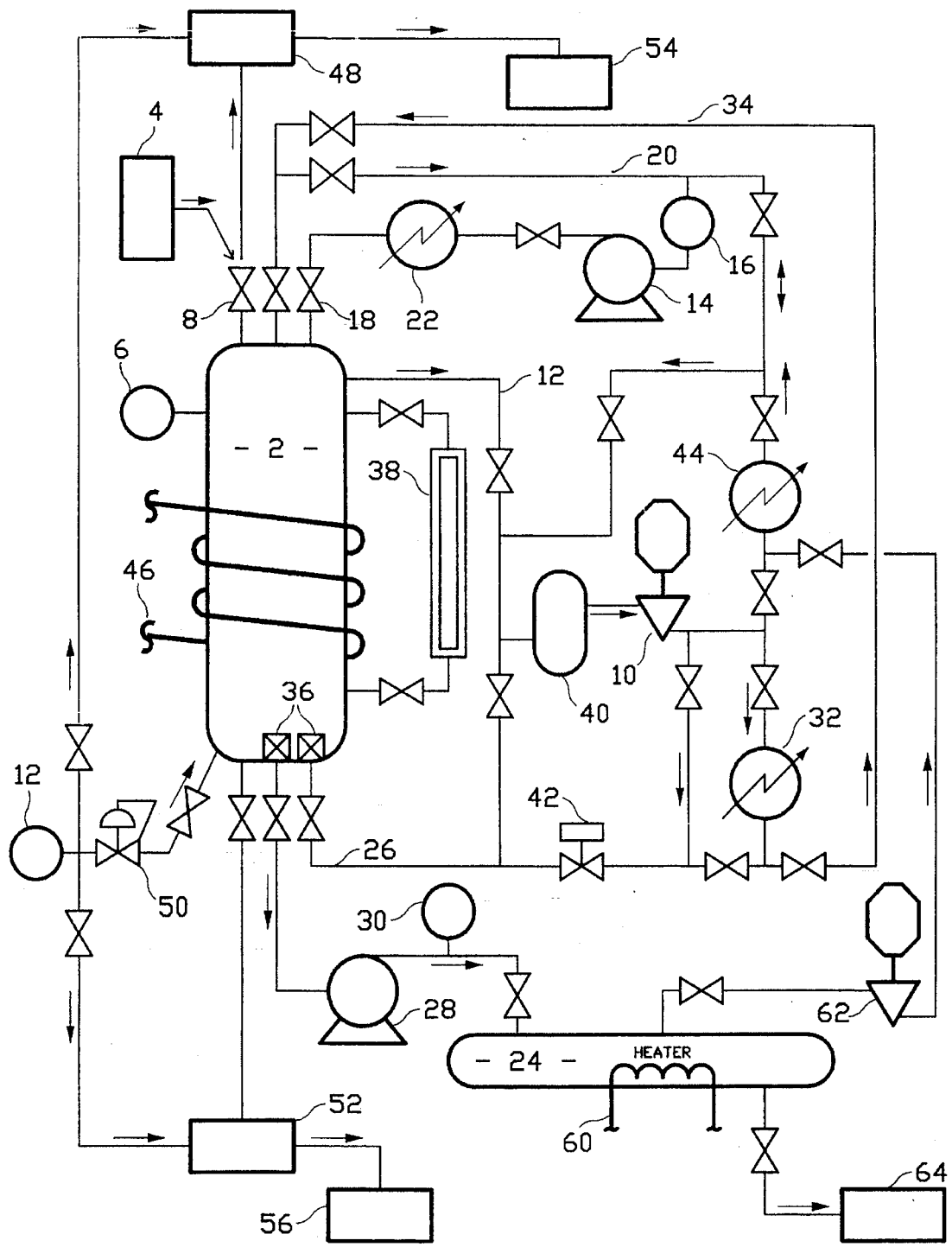

Referring now to the drawings in more detail, FIG. 1 illustrates, in a schematic form, a system for extracting oil from an oil bearing plant material in accordance with the present invention. As can be seen in the drawing, the system comprises a reactor vessel 2 designed to receive an oil bearing plant material, for example, rice bran.

Reactor vessel 2 is loaded with rice bran through an opening in the top by means of pneumatic loading system 4. Reactor 2 may include material level gauge 6 to indicate when reactor 2 is filed with raw rice bran to a desired level. Level gauge 6 may automatically cause shut-down of pneumatic loading system 4 when a desired fill level has been reached.

Rice bran will build up and clog if left to settle in the pneumatic loading system. This raw rice bran will commence free fatty acid build up and acceleration of rancidity will result. Pneumatic loading system 4 should be kept as clear as practical between loading operations.

Valve 8 in the top of reactor 2 is closed after the pneumatic loading lines are blown clear. Using vacuum pump 10, preferably an oilless compressor, or alternatively, two compressors, a vacuum of 12–15 inches Hg. (8.5–8.8 psia) is established in the reactor. An inert gas, preferably nitrogen, is then introduced from tank 12 into reactor 2, thereby pressuring the reactor to a positive 15–25 psig (30–40 psia). Then a second vacuum of 12–15 inches Hg. (8.5–8.8 psia) is established within the reactor and within evacuation line 12. The vacuum system is then disengaged and the reactor is ready for liquid solvent filling.

Liquid solvent, preferably propane, at a temperature of between 68° and 125° F. is pumped by means of pump 14 from tank 16 into reactor 2 through an opening 18 in the top of the reactor vessel. When the gauge pressure in reactor 2 increases to 5 psig (20 psia) below the gauge pressure in solvent storage vessel 16, by-pass line 20 is opened to allow vapors collecting in reactor 2 to move to the vapor section of solvent storage vessel (16), thereby permitting a constant and continuous movement of liquid solvent into reactor 2. At a predetermined level of liquid in the reactor, preferably when rice bran within the reactor is covered by liquid solvent, by-pass line 20 is closed and final movement of liquid solvent into reactor 2 takes place. By-pass 20 line is closed prior to complete liquid filling to prevent material from flowing back into the vapor lines. The solvent fill system is then disengaged. The liquid solvent is constantly maintained by means of heat exchanger 22 within the temperature range of 68°–125° F., preferably 68°–72° F., prior to and during liquid filling of reactor 2 in order to cause the liquid solvent to dissolve the rice oil from the rice bran in reactor 2 at a predetermined rate and time. As solvent temperature increases beyond 72° F., the color of the rice bran oil darkens. Within 68°–72° F., the rice bran oil remains light in color.

Before removing the liquid solvent containing dissolved oil from reactor 2 to separator 24, additional solvent vapors from solvent storage vessel 16 are introduced at from 10 to 20 psig (25–35 psia) above reactor pressure into the bottom of reactor 2 to mix the rice bran in the liquid solvent and oil combination, thereby commencing a first stage in a preclassification of material in the reactor. This preclassification mixing procedure causes the heavier rice bran particulates to settle at the bottom of the reactor with the finer particulates, also called fines, floating to the top of reactor 2.

After allowing the contents of the reactor to settle, usually 10–15 minutes, the liquid solvent and oil combination is then transferred from the bottom of reactor 2 to the top of separator 24. The liquid solvent and oil combination is pumped by means of pump 28 past indicator 30, which measures gravity of the liquid solvent and oil combination to determine the percentage of oil in the solvent. While indicator 30 registers greater than 1% oil in the liquid solvent and oil combination, pump 14 is turned on to pump fresh liquid solvent from storage vessel 16, through valve 18, and into reactor 2 to maintain a constant level of liquid in reactor 2. When indicator 30 registers less than 1% oil in the liquid solvent and oil combination, pump 14 is turned off. As the liquid solvent and oil combination is pumped by means of pump 28 from reactor 2 to separator 24, fresh solvent vapors from storage vessel 16 are added to reactor 2 by means of compressor 10 through heat exchanger 32, thereby forcing hot solvent vapors into the top of reactor 2 through line 34 and pushing remaining liquid solvent and oil combination through the rice bran in reactor 2, through filter system 36 in the bottom of reactor 2 and into separator 24. Fresh solvent vapors are added until a predetermined liquid level shows that approximately 10% liquid solvent and oil combination remain in reactor 2. Either sight glass 38 or an automated indicator allows the liquid level to be monitored. The liquid transfer from the reactor to the separator is then stopped by turning off pump 28.

Additional heated solvent vapors are introduced into reactor 2 from storage vessel 16 by means of compressor 10 through heating coil 32 to increase the pressure by between 25 and 35 psig (40–50 psia). After waiting approximately 6 to 10 minutes after the desired pressure is reached, the liquid transfer system is reopened by engaging pump 28, thereby allowing liquid transfer to separator 24. After 2 to 3 minutes of pumping, the liquid transfer system is disengaged. The repeated introduction of heated solvent vapors at elevated pressure into the top of reactor 2 acts to force out of the bottom of reactor 2 remaining liquid solvent and oil combination. Preferably, heated solvent vapors at elevated pressure are introduced into reactor 2 three separate times. The repeated forcing of heated solvent vapors into reactor 2 acts as a vapor plunger to squeeze from the rice bran remaining liquid solvent and oil combination.

Figure 2:
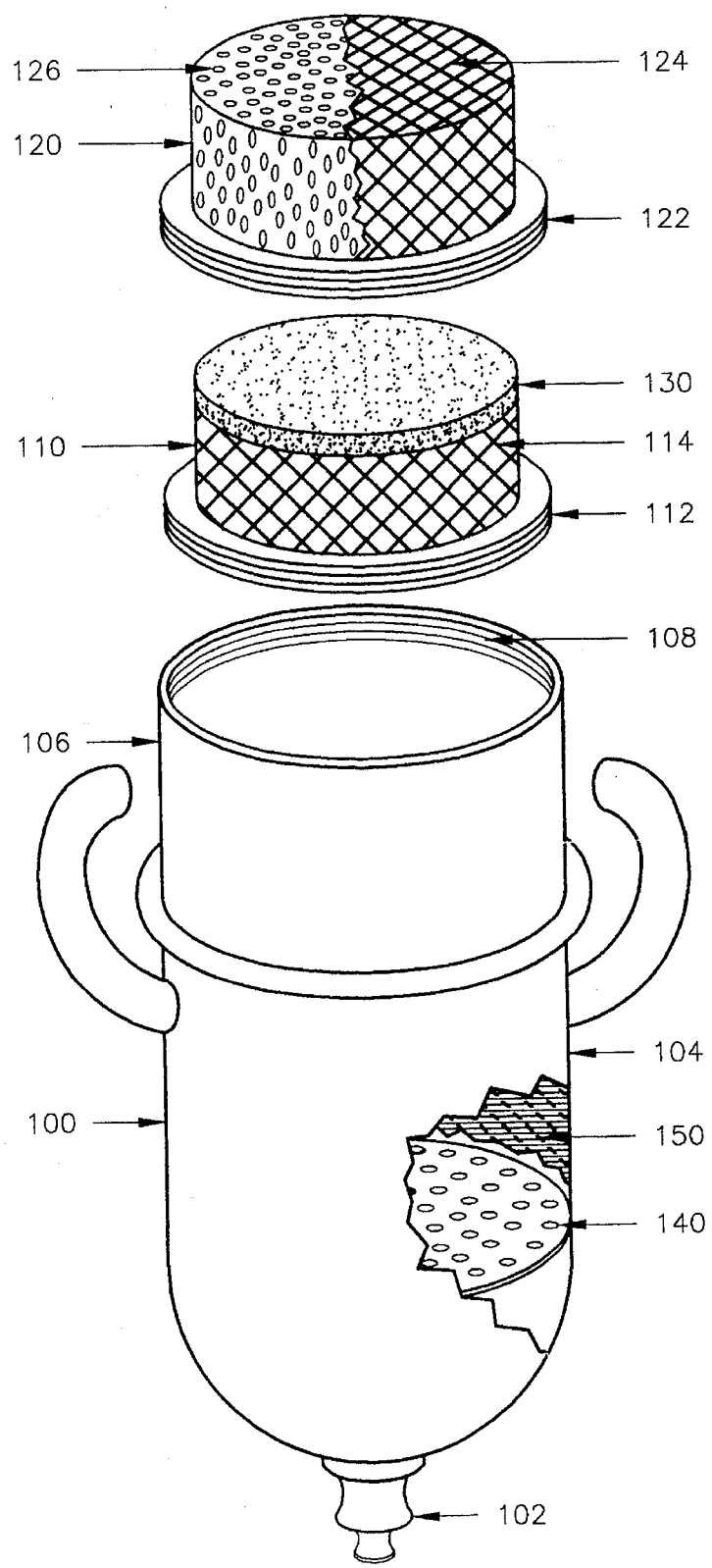

Preferably, filter system 36 in the bottom of reactor 2 includes filters dispersed throughout the bottom of reactor 2 to expedite solvent recovery and also to prevent channeling of liquid solvent and oil combination in the reactor. Such channeling would result in an inefficient exhausting of the liquid solvent and oil combination. Preferably, the filters are removable cartridges utilizing a 60 mesh screen outer covering with a polyester fiber material located within the 60 mesh screen. As shown in FIG. 2, filter system 32 comprises filter cartridge 100, reinforcing body 110, inlet body 120, mesh filter screen 130, perforated plate 140 and polyester fiber 150. Filter cartridge 100 has discharge nozzle 102 disposed at one end, central portion 104 and upper body portion 106. Upper body portion 106 contains interior threads 108 and protrudes upward from central body portion 104. Upper body portion 106 is adapted to be connected by means of interior threads 108 to exterior threads 112 of reinforcing body 110 and to exterior threads 122 of inlet body 120.

Reinforcing body 110 and inlet body 120 are substantially cylindrical. Reinforcing body 110 is nested within inlet body 120 with filter screen 130 disposed between reinforcing portion 114 of reinforcing body 110 and reinforcing portion 124 of inlet body 120. Inlet body 120 contains perforated covering 126 around the periphery of reinforcing portion 124.

Mesh filter screen 130 is disposed between the reenforcing portions 114 and 124 of reenforcing body 110 and inlet body 120, respectfully. Preferably, mesh filter screen 130 comprises 60 mesh.

Within central and upper body portions 104 and 106 of filter cartridge 100 and within reinforcing body 110 is contained polyester fiber 150 to filter bran particles that pass through the 60 mesh filter screen. Perforated plate 140 is disposed within filter cartridge 100 to keep polyester fiber 150 from migrating downstream. Preferably, the filters are inserted approximately ½" into the bottom of reactor 2 to alleviate channeling and clogging.

Knock-out tank 40 leading into compressor 10 is filled with solvent vapors from storage vessel 16. The output of compressor 10 is directed to filter system 36 that is inserted in the bottom of reactor 2. Compressor 10 is turned on and pressure is allowed to build in line 26 to approximately 250–270 psig (265–285 psia). A valve at the bottom of the filter is then opened allowing compressed vapors to be forced rapidly through the filter and into reactor 2. Preferably regulator 42 automatically feeds bursts of solvent vapors at 250–275 psig (265–290 psia) upward through filter 36 into reactor 2. This procedure is repeated three times. This procedure is a second stage in the preclassification of material in the reactor. This second stage preclassification procedure removes fines that accumulate on the filter during removal of the liquid solvent and oil combination and dispenses said fines within the reactor.

The bottom of reactor 2 is made common to knock-out tank 40 of compressor 10 with the output of compressor 10 being piped to condenser 44. Compressor 10 draws vapors out of the bottom of reactor 2.

Solvent vapor is then drawn from the bottom of reactor 2, through compressor 10 then sent to condenser 44, and to solvent storage tank 16, until pressure in the reactor is approximately 85 to 90 psig (100–105 psia). When pressure in the reactor is approximately 85–90 psig (100–105 psia), this solvent vapor from the reactor is sent to heat exchanger 32 where it is heated to between 80° and 150° F., and then directed to the top of reactor 2 through line 34 and circulated through the material in reactor 2, thereby heating and vaporizing any traces of liquid solvent that may be trapped in the material. As liquid solvent remaining in the material in reactor 2 is vaporized, the pressure in the reactor rises, solvent vapors build up and are drawn off and sent to condenser 44 to maintain the consistent pressure range of 80 to 100 psig (115 psia) in reactor 2. At the beginning of this recirculation of solvent vapors, material in the top section of the reactor is between 80° and 150° F. and material at the bottom of the reactor is between 50° and 80° F.

Heater 46 around the circumference of the bottom half of reactor 2 is also placed into service at this time. water of 150° to 180° F. is circulated through heater 46. Heater 46 acts as a barrier to keep the heat generated by the recirculation of hot solvent vapors inside the reactor during this stage of heating the material to expel remaining traces of liquid solvent. Alternatively, reactor vessel 2 can be insulated to retain heat within the vessel. Recirculated hot solvent vapors move down through the material in reactor 2, heating and vaporizing the remaining liquid solvent until the temperature of the material in the bottom of the reactor reaches 90°–140° F. It is important to allow a complete mix of hot solvent vapors with materials in reactor 2 to ensure that refrigeration will not occur as solvent vapors are removed and sent to condenser 44. When the temperature in the bottom of the reactor has reached 90° to 140° F., all vapors are removed from the reactor and the top and bottom temperatures equalize at between 90° and 140° F. Solvent vapors are continued to be pulled from reactor 2 until the pressure in reactor 2 is 0 psig (15 psia). The vapor recovery system is disengaged.

A vacuum of 12 to 15 inches Hg. (8.5–8.8 psia) utilizing a vacuum pump or compressor 10 or alternatively two compressors are introduced into reactor 2. An inert gas is introduced from tank 12 into the bottom of reactor 2 at a slow steady pressure until the reactor is brought back to 0 psig (15 psia). This inert gas is then injected in the bottom of reactor 2 in short strong bursts until positive pressure of 20 to 25 psig (35–40 psia) is reached.

Reactor 2 is once again pulled to a vacuum of 12 to 15 inches Hg (8.5–8.8 psia). Inert gas or dry compressed air is then introduced into the bottom of the reactor, this time at a slow steady pressure until the reactor is brought to 0 psig. This is the third and final stage in the preclassification procedure, which again disperses fines from the filter, and which also layers the fines within the reactor in accordance with particle size. The classified material is now ready to be unloaded solvent free.

Before general unloading of reactor 2, a vacuum is introduced into reactor 2 by means of top venturi 48 and an inert gas or dry compressed air is introduced into the bottom of the reactor at a steady pressure of 25 to 100 psig (40–115 psia), by means of regulator 50, while fines are drawn off the top of reactor 2. After the fines are removed, the inert gas or dry compressed air is shut-off and remaining material is evacuated from the reactor. Preferably, a venturi will be used at the top and bottom of the reactor vessel. Top venturi 48 will be engaged first while introducing an inert gas or dry compressed air from 25 to 100 psig (40–115 psia) into the bottom of the reactor to remove the fines. After a predetermined amount of time, bottom venturi 52 will be placed in operation leaving top venturi 48 operating to capture the fines that move upward during general unloading. Preferably, all unloaded material is sent to suitable classifiers 54 and 56. After all material is evacuated from reactor 2, the venturi 48 and venturi 52 and classifiers 54 and 56 are shut-down.

The liquid in separator 24 contains solvent and oil. The liquid within separator 24 is heated to between 70° and 120° F., preferably between 70° F. and 100° F. This vaporizes the solvent. Solvent vapor is drawn from separator 24 by compressor 62 and is liquified in condenser 44 and then sent to storage tank 16. When substantially all of the solvent vapor has been drawn from separator 24, the oil is then dumped to oil holding tank 64.

For the process according to the invention, material must be dehulled, and/or ground and/or flaked or in the case of fruit (avocado, olive, coconut, etc.) depitted, dehydrated then ground and/or flaked. The particle size for grinding is from a #40 to #325 mesh, preferably a #100 to #325 mesh, particulate size or flaked from 0.1 mm to 0.4 mm, preferably 0.3 mm. This grinding or flaking is done to increase the overall surface/volume ratio, the more area of contact the particulate has with a solvent the better the extraction. If in this case of seed the hull is a small percentage of the overall seed, dehulling may be omitted (e.g., rapeseed).

This process is also applicable to pre-press cake. Pre-press cake is a result of a screw press extractor which is used to extract oil out of material that is generally at least 20% oil rich. The screw press is the most common press in commercial use for extracting oil from plant parts (e.g., soybeans, rapeseed, cottonseed, peanut, flaxseed, jojoba, copra, etc.). Preparation for extraction of this prepressed cake would involve grinding or flaking the material to a #40 to #325 mesh, preferably a #100 to #325 mesh particulate size or flaked from 0.1 mm to 0.4 mm, preferably 0.3 mm.

EXAMPLE 1

40 lbs. of raw rice bran was obtained from a commercial rice miller. This raw rice bran was of particulate size #40 to #325 mesh. This raw rice bran was ground to a minimum particle size of #100 to #325 mesh. The ground raw rice bran was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the rice bran in the solvent and oil combination. The liquid solvent and oil combination was then drained from reactor 2 and pumped into separator 24. Additional liquid solvent was pumped into the top of reactor 2 while removing the liquid solvent and oil combination from the bottom of reactor 2 until there was less than 1% of oil remaining in the rice bran. The liquid was then removed from reactor 2 and vapors were drawn off through the method described above.

33 lbs. 10 oz. of defatted rice bran were removed from reactor 2 and 6 lbs. 6 oz. of oil was removed from the separator.

EXAMPLE 2

40 lbs. of corn was obtained from a commercial feed mill. This corn was then ground to a #100 to #325 mesh. The ground corn was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the corn in the solvent and oil combination. The liquid solvent and oil combination was then drained from reactor 2 and pumped into separator 24. Additional liquid solvent was pumped into the top of reactor 2 while removing the liquid solvent oil from the top of reactor 2 until there was less than 1% of oil remaining in the corn. The liquid was then removed from reactor 2 and vapors are drawn off through the method described above.

36 lbs. 8 oz. of defatted corn were removed from reactor 2 and 3 lbs. 8 oz. of oil was removed from the separator.

EXAMPLE 3

40 lbs. of rapeseed/canola was obtained from the cooperative extension service of a local university. This rapeseed/canola was then ground to a #100 to #325 mesh. The ground rapeseed/canola was then loaded into reactor vessel 2. After air was evacuated through a vacuum, a inert gas purge and a second vacuum, the liquid solvent was introduced into the reactor through opening 18. Additional solvent vapors were introduced into the bottom of reactor 2 to mix the rapeseed/canola in the solvent and oil combination. The liquid solvent and oil combination was then drained from reactor 2 and pumped into separator 24. Additional liquid solvent was pumped into the top of reactor 2 while removing the liquid solvent and oil from the bottom of reactor 2 until there was less than 1% of oil remaining in the rapeseed/canola. The liquid was then removed from reactor 2 and vapors were drawn off through the method described above.

30 lbs. of defatted rapeseed/canola were removed from reactor 2 and 3 lbs. 8 oz. of oil was removed from the separator.

EXAMPLE 4

40 lbs. of soybean was obtained from a commercial feed mill. This soybean was then ground to a #100 to #325 mesh. The ground soybean was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the soybean in the solvent and oil combination. The liquid solvent and oil combination was then drained from reactor 2 and pumped into separator 24. Additional liquid solvent was pumped into the top of reactor 2 while removing the liquid solvent oil from the bottom of reactor 2 until there was less than 1% of oil remaining in the soybean. The liquid was then removed from reactor 2 and vapors were drawn off through the method described above.

33 lbs. 3 oz. of defatted soybean were removed from reactor 2 and 6 lbs. 13 oz. of oil was removed from the separator.

EXAMPLE 5

40 lbs. of cardamom was obtained from a Central American exporter. This cardamom was then ground to a #100 to #325 mesh. The ground cardamom was then loaded into reactor vessel 2. After air was evacuated through a vacuum, an inert gas purge and a second vacuum, the solvent was introduced into the reactor through opening 18. Additional solvent vapors were introduced into the bottom of reactor 2 to mix the cardamom in the solvent and oil combination. The liquid solvent and oil combination was then drained from reactor 2 and pumped into separator 24. Additional liquid solvent was pumped into top of reactor 2 while removing the liquid solvent and oil from the bottom of reactor 2 until there was less than 1% of oil remaining in the cardamom. The liquid was then removed from reactor 2 and vapors are drawn off through the method described above.

32 lbs. 13 oz. of defatted cardamom were removed from reactor 2 and 7 lbs. 3 oz. of oil was removed from the separator.

EXAMPLE 6

40 lbs. of pre-press jojoba cake was obtained from a commercial screw type extractor. This jojoba cake was then ground to a #100 to #325 mesh. The ground jojoba cake was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the jojoba in the solvent and oil combination. The liquid solvent and oil combination was then drained from reactor 2 and pumped into separator 24. Additional liquid solvent was pumped into the top of reactor 2 while removing the liquid solvent oil from the bottom of reactor 2 until there was less than 1% of oil remaining in the jojoba. The liquid was then removed from the reactor 2 and vapors were drawn off through the method described above.

35 lbs. 13 oz. of defatted jojoba cake were removed from reactor 2 and 4 lbs. 3 oz. of oil was removed from the separator.

EXAMPLE 7

40 lbs. of pre-press peanut cake was obtained from a commercial screw type extractor. This peanut cake was then ground to a #100 to #325 mesh. The ground peanut cake was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the peanut cake in the solvent and oil combination. The liquid solvent and oil combination was then drained from reactor 2 and pumped into separator 24. Additional liquid solvent was pumped into the top of reactor 2 while removing the liquid solvent and oil from the bottom of reactor 2 until there was less than 1% of oil remaining in the peanut cake. The liquid was then removed from reactor 2 and vapors were drawn off through the method described above.

36 lbs. 13 oz. of defatted peanut cake were removed from reactor 2 and 3 lbs. 3 oz. of oil was removed from the separator.

EXAMPLE 8

40 lbs. of kenaf seed was obtained from a manufacturer of absorbents using kenaf fiber. This kenaf was then ground to a #100 to a 325 mesh. The ground kenaf was then loaded into reactor vessel 2. After air was evacuated through a vacuum, an inert gas purge and a second vacuum, the liquid solvent was introduced into the reactor through opening 18. Additional solvent vapors were introduced into the bottom of reactor 2 to mix the kenaf in the solvent and oil combination. The liquid solvent oil and combination was then drained from reactor 2 and pumped into separator 24. Additional liquid solvent was pumped into the top of reactor 2 while removing the liquid solvent oil from the bottom of reactor 2 until there was less than 1% of oil remaining in the kenaf. The liquid was then removed from reactor 2 and vapors were drawn off through the method described above.

33 lbs. 7 oz. of defatted kenaf seed were removed from reactor 2 and 6 lbs. 9 oz. of oil was removed from the separator.

We claim:

1. A process for extracting oil from oil bearing plants, the process comprising the steps of:

placing oil bearing plant material selected from a group consisting of rice bran, corn, rapeseed/canola, soybean, cardamom, prepressed peanut cake, prepressed jojoba cake, and kenaf;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having ability to dissolve plant material oil, the liquid solvent being maintained at a temperature of between 68° F. and 72=20 F.;

allowing the liquid solvent to contact the plant material for a time sufficient to dissolve a substantial portion of the plant material oil;

introducing pressurized solvent vapors into a bottom of the reactor vessel to cause mixing of the plant material in the solvent and oil combination, thereby facilitating separation of fine particulate matter from heavier particles in the reactor vessel;

introducing pressurized heated solvent vapors into a top of the reactor vessel while the liquid solvent and oil combination is being removed from the bottom of the reactor vessel;

transferring solvent and plant material oil combination from the reactor vessel to a separator vessel and then vaporizing the solvent in the separator vessel at a temperature sufficient to cause vaporization of the solvent while preventing denaturing of constituent components of plant oil.

2. The process according to claim 1, further comprising the steps of:

removing substantially all solvent remaining in the reactor vessel by introducing heated solvent vapor into the top of the reactor vessel to increase reactor pressure by between 40 and 80 psia, removing liquid through the bottom of the reactor vessel, and twice repeating the introducing heated vapor and removing liquid step.

3. The process according to claim 2, further comprising the steps of:

forcing solvent vapor at between 265 and 285 psia into the bottom of the reactor vessel through a filter in a short burst and twice repeating the forcing solvent vapor step.

4. The process according to claim 3, further comprising the step of:

reducing reactor pressure to between 100 and 105 psia, thereby allowing heated solvent vapors to be removed without causing freezing of the solvent vapors.

5. The process according to claim 4, further comprising the steps of:

removing vapor through the bottom of the reactor vessel, heating the vapor to between 80° F. and 150° F. and introducing the heated vapor through the top of the reactor vessel, thereby vaporizing traces of liquid solvent remaining in the reactor.

6. The process according to claim 5, further comprising the steps of:

removing vapor from the reactor vessel, condensing the removed vapor, and transferring the condensed solvent to a storage vessel.

7. The process according to claim 6, further comprising the steps of:

introducing an inert gas into the reactor vessel to increase pressure to 15 psia, forcing inert gas into the reactor vessel in repeated bursts to increase reactor pressure to between 35 and 40 psia, and removing the inert gas from the reactor vessel to reduce pressure therein to between 8.5 and 8.8 psia.

8. The process according to claim 7, further comprising the step of:

unloading residual plant material from the reactor.

9. The process according to claim 8, whereby the unloading step is accomplished by means of a top venturi while dry compressed air is introduced into the bottom of the reactor vessel at between 40 and 115 psia.

10. The process according to claim 9, further comprising the step of unloading plant material from the bottom of the reactor vessel.

11. The process according to claim 10, whereby the unloading of plant material step is accomplished by means of a bottom venturi.

12. A process for extracting oil from oil bearing plant material, the process comprising the steps of:

placing oil bearing plant material selected from a group consisting of rice bran, corn, rapeseed/canola, soybean, cardamom, prepressed peanut cake, prepressed jojoba cake and kenaf;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having solvent power for plant material oil, the liquid solvent being maintained at a temperature of between 68° F. and 125° F.;

allowing the liquid solvent to contact the plant material for a time sufficient to dissolve a substantial portion of the plant material oil;

introducing pressurized solvent vapors into a bottom of the reactor vessel to cause mixing of the plant material in the solvent and oil combination, thereby facilitating separation of fine particulate matter from heavier particles in the reactor vessel;

introducing pressurized heated solvent vapors into a top of the reactor vessel while the liquid solvent and oil combination is being removed from the bottom of the reactor vessel, so as to facilitate removal of the liquid solvent and oil combination from the reactor vessel;

transferring solvent and plant material oil combination from the reactor vessel to a separator vessel and then vaporizing the solvent within the separator vessel at a temperature sufficient to cause vaporization of the solvent while preventing denaturing of constituent components of plant oil.

13. A process for extracting oil from rice bran, the process comprising the steps of:

loading rice bran containing rice bran oil into a reactor vessel;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having ability to dissolve rice bran oil, the liquid solvent being maintained at a temperature of between 68° F. and 72° F.;

allowing the liquid solvent to contact the rice bran for a time sufficient to dissolve a substantial portion of the rice bran oil;

introducing pressurized solvent vapors into a bottom of the reactor vessel to cause mixing of the rice bran in the solvent and oil combination, thereby facilitating separation of fine particulate matter from heavier particles in the reactor vessel;

introducing pressurized heated solvent vapors into a top of the reactor vessel while the liquid solvent and oil combination is being removed from the bottom of the reactor vessel, so as to facilitate removal of the liquid solvent and oil combination from the reactor vessel;

transferring solvent and rice bran oil combination from the reactor vessel to a separator vessel and then vaporizing the solvent within the separator vessel at a temperature sufficient to cause vaporization of the solvent while preventing denaturing of constituent components of rice bran oil.

14. The process according to claim 13, further comprising the steps of:

removing substantially all solvent remaining in the reactor vessel by introducing heated solvent vapor into the top of the reactor vessel to increase reactor pressure by between 40 and 80 psia, removing liquid through the bottom of the vessel, and twice repeating the introducing heated vapor and removing liquid step.

15. The process according to claim 13, further comprising the steps of:

forcing solvent vapor at between 265 and 285 psia into the bottom of the reactor vessel through a filter in a short burst and twice repeating the forcing solvent vapor step.

16. The process according to claim 15, further comprising the step of:

reducing the reactor pressure to between 100 and 105 psia, thereby allowing heated solvent vapors to be removed without causing freezing of the solvent vapors.

17. The process according to claim 16, further comprising the steps of:

removing vapor through the bottom of the reactor vessel, heating the vapor to between 80° F. and 150° F., and introducing the heated vapor through the top of the reactor vessel, thereby vaporizing traces of liquid solvent remaining in the reactor.

18. The process according to claim 17, further comprising the steps of:

removing vapor from the reactor vessel, condensing the removed vapor, and transferring the condensed solvent to a storage vessel.

19. The process according to claim 18, further comprising the steps of:

introducing an inert gas into the reactor vessel to increase pressure to 15 psia, forcing inert gas into the reactor vessel in repeated bursts to increase reactor pressure to between 35 and 40 psia, and removing the inert gas from the reactor vessel to reduce pressure therein to between 8.5 and 8.8 psia.

20. The process according to claim 19, further comprising the step of:

unloading residual rice bran from the reactor.

21. The process according to claim 20, whereby the unloading step is accomplished by means of a top venturi while dry compressed air is introduced into the bottom of the reactor vessel at between 40 and 115 psia.

22. The process according to claim 21, further comprising the step of unloading rice bran from the bottom of the reactor vessel.

23. The process according to claim 22, whereby the unloading of rice bran step is accomplished by means of a bottom venturi.

24. A process for extracting rice bran oil from rice bran, the process comprising the steps of:

loading rice bran containing rice bran oil into a reactor vessel;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having solvent power for rice bran oil, the liquid solvent being maintained at a temperature of between 68° F. and 125° F.;

allowing the liquid solvent to contact the rice bran for a time sufficient to dissolve a substantial portion of the rice bran oil;

introducing pressurized solvent vapors into a bottom of the reactor vessel to cause mixing of the rice bran in the solvent and oil combination, thereby facilitating separation of fine particulate matter from heavier particles in the reactor vessel;

introducing pressurized heated solvent vapors into a top of the reactor vessel while the liquid solvent and oil combination is being removed from the bottom of the reactor vessel, so as to facilitate removal of the liquid solvent and oil combination from the reactor vessel;

transferring solvent and rice bran oil combination from the reactor vessel to a separator vessel and then vaporizing the solvent within the separator vessel at a temperature sufficient to cause vaporization of the solvent while preventing denaturing of constituent components of rice bran oil.

25. A process for extracting oil from oil bearing plant material, the process comprising the steps of:

loading oil bearing plant material selected from a group consisting of oil bearing plant parts that can be ground to a particle size of between #100 to #325 mesh into a reactor vessel;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having ability to dissolve plant material oil, the liquid solvent being maintained at a temperature of between 68° F. and 72° F.;

allowing the liquid solvent to contact the plant material for a time sufficient to dissolve a substantial portion of the plant material;

introducing pressurized solvent vapors into a bottom of the reactor vessel to cause mixing of the plant material in the liquid solvent and oil combination, thereby facilitating separation of fine particulate matter from heavier particles in the reactor vessel;

transferring solvent and plant material oil combination from the reactor vessel to a separator vessel and then vaporizing the solvent within the separator vessel at a temperature between 70° F. and 120° F., thereby avoiding denaturing of constituent components of the oil.

26. The process according to claim 25, further comprising the steps of:

removing substantially all solvent remaining in the reactor vessel by introducing heated solvent vapor into the top of the reactor vessel to increase reactor pressure by between 40 and 80 psia, removing liquid through the bottom of the vessel, and twice repeating the introducing heated vapor and removing liquid step.

27. The process according to claim 26, further comprising the steps of:

forcing solvent vapor at between 265 and 285 psia into the bottom of the reactor vessel through a filter in a short burst and twice repeating the forcing solvent vapor step.

28. The process according to claim 27, further comprising the step of:

reducing reactor pressure to between 100 and 105 psia, thereby allowing heated solvent vapors to be removed without causing freezing of the solvent vapors.

29. The process according to claim 28, further comprising the steps of:

removing vapor through the bottom of the reactor vessel, heating the vapor to between 80° F. and 150° F., and introducing the heated vapor through the top of the reactor vessel, thereby vaporizing traces of liquid solvent remaining in the reactor.

30. The process according to claim 29, further comprising the steps of:

removing vapor from the reactor vessel, condensing the removed vapor, and transferring the condensed solvent to a storage vessel.

31. The process according to claim 30, further comprising the steps of:

introducing an inert gas into the reactor vessel to increase pressure to 15 psia, forcing inert gas into the reactor vessel in repeated bursts to increase reactor pressure to between 35 and 40 psia, and removing the inert gas from the reactor vessel to reduce pressure therein to between 8.5 and 8.8 psia.

32. The process according to claim 31, further comprising the step of:

unloading residual plant material from the reactor.

33. The process according to claim 32, whereby the unloading step is accomplished by means of a top venturi while dry compressed air is introduced into the bottom of the reactor vessel at between 40 and 115 psia.

34. The process according to claim 32, further comprising the step of unloading plant material from the bottom of the reactor vessel.

35. The process according to claim 34, whereby the unloading of plant material step is accomplished by means of a bottom venturi.

36. A process for extracting oil from oil bearing plant material, the process comprising the steps of:

loading oil bearing plant material selected from a group consisting of oil bearing plant parts that can be ground to particle size of between #100 to #325 mesh into a reactor vessel;

removing air from the reactor vessel to establish a first partial vacuum of 8.5 to 8.8 psia, introducing an inert gas under pressure to dispel additional air, and establishing a second partial vacuum of 8.5 to 8.8 psia;

introducing into the reactor vessel a liquid solvent having solvent power for plant material oil, the liquid solvent being maintained at a temperature of between 68° F. and 125° F.;

allowing the liquid solvent to contact the plant material for a time sufficient to dissolve a substantial portion of the plant material oil;

introducing pressurized heated solvent vapors into a top of the reactor vessel while the liquid solvent and oil combination is being removed from a bottom of the reactor vessel;

transferring solvent and plant material oil combination from the reactor vessel to a separator vessel and then vaporizing the solvent within the separator vessel at a temperature between 70° F. and 120° F., thereby avoiding denaturing of constituent components of the oil.

* * * * *

UNITED STATES PATENT AND TRADEMARK OFFICE
CERTIFICATE OF CORRECTION

PATENT NO. : 5,516,923
DATED : May 14, 1996
INVENTOR(S) : Roland M. Hebert, Robert J. Stonicher, Robert T. Tucker It is certified that error appears in the above-indentified patent and that said Letters Patent is hereby corrected as shown below:

On the title page: Item [73]

Assignee: Agritech International, L.L.C., Crowley, LA--

Signed and Sealed this

Fifteenth Day of October, 1996

Attest:

BRUCE LEHMAN

*Attesting Officer*     *Commissioner of Patents and Trademarks*